US012369075B2

United States Patent
Tiwari et al.

(10) Patent No.: US 12,369,075 B2
(45) Date of Patent: Jul. 22, 2025

(54) SECTOR LOAD IMBALANCE IDENTIFICATION SYSTEM, METHOD, DEVICE, AND PROGRAM

(71) Applicant: Rakuten Symphony, Inc., Tokyo (JP)

(72) Inventors: Pratishtha Tiwari, Indore (IN); Nilesh Bankar, Indore (IN); Durgesh Rathore, Indore (IN); Keshav Sharma, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 17/784,413

(22) PCT Filed: Feb. 23, 2022

(86) PCT No.: PCT/US2022/017415
§ 371 (c)(1),
(2) Date: Jun. 10, 2022

(87) PCT Pub. No.: WO2023/163695
PCT Pub. Date: Aug. 31, 2023

(65) Prior Publication Data
US 2024/0172045 A1  May 23, 2024

(51) Int. Cl.
*H04W 28/086* (2023.01)
*H04W 28/02* (2009.01)
*H04W 48/20* (2009.01)

(52) U.S. Cl.
CPC ... *H04W 28/0862* (2023.05); *H04W 28/0268* (2013.01); *H04W 48/20* (2013.01)

(58) Field of Classification Search
CPC ......... H04W 28/0862; H04W 28/0268; H04W 48/20; H04W 16/04; H04W 16/18; H04W 24/04; H04W 24/02; H04W 28/08
See application file for complete search history.

(56) References Cited

U.S. PATENT DOCUMENTS 8,498,207 B2 * 7/2013 Trigui ................ H04L 41/5025
455/445
11,131,538 B2 * 9/2021 Shah .................... H04W 16/18
(Continued)

FOREIGN PATENT DOCUMENTS

WO  WO-2017108106 A1 *  6/2017

OTHER PUBLICATIONS

LTE: Evolved Universal Terrestrial Radio Access (E-UTRA), Radio Frequency (RF) System Scenarios, 3GPP TR 36.942 version 9.1.0 Release 9 11, ETSI TR 136 942 V9.1.0 (Oct. 2010), p. 11, Section 4.2.1.2 (Year: 2010).*

(Continued)

*Primary Examiner* — Charles C Jiang
*Assistant Examiner* — Margaret Marie Anderson
(74) *Attorney, Agent, or Firm* — Sughrue Mion, PLLC

(57) ABSTRACT

A method of identifying sector load imbalance. The method includes identifying a first set of imbalanced cells in a sector based on a first condition, wherein the first condition is based on network usage of the cells in the sector. The method further includes identifying a second set of imbalanced cells from the first set of imbalanced cells based on a second condition, wherein the second condition is based on one or more physical parameters associated with each of the first set of imbalanced cells. The method further includes displaying visualizations associated with the second set of imbalanced cells, the visualizations indicating miscalculations of the one or more physical parameters.

20 Claims, 9 Drawing Sheets

(56) References Cited

U.S. PATENT DOCUMENTS

| | | | |
|---|---|---|---|
| 11,184,228 B2* | 11/2021 | Kandhasamy Narayanan | ............ H04L 12/4641 |
| 11,395,151 B2* | 7/2022 | Tiwari | .................. H04W 16/18 |
| 11,729,647 B2* | 8/2023 | Chou | .................... H04W 24/04 455/422.1 |

OTHER PUBLICATIONS

Sharawi, Mahommad, RF Planning and Optimization for LTE Networks, Chapter 11 in Evolved Cellular Network Planning and Optimization for UTS and LTE, CRC Press, ISBN: 9781439806494, Aug. 2010 (Year: 2010).*

Bratu, Vlad-Ioan, Master of Science Thesis performed at the Radio Communication Systems Group, KTH. Jun. 2012 (Year: 2012).*

N. Zia and A. Mitschele-Thiel, "Self-organized neighborhood mobility load balancing for LTE networks," 2013 IFIP Wireless Days (WD), Valencia, Spain, 2013, pp. 1-6, doi: 10.1109/WD.2013.6686466 (Year: 2013).*

Sumita Mishra and Nidhi Mathur, Load Balancing Optimization in LTE/LTE-A Cellular Networks: A Review, Journal, Amity University, Dec. 23, 2014 (Year: 2014).*

International Search Report dated Jun. 15, 2022 in International Application No. PCT/US 22/17415.

Written Opinion of the International Searching Authority dated Jun. 15, 2022 in International Application No. PCT/US 22/17415.

* cited by examiner

SECTOR LOAD IMBALANCE IDENTIFICATION SYSTEM, METHOD, DEVICE, AND PROGRAM

FIELD OF THE INVENTION

The present disclosure relates to identifying load imbalance in a telecommunication network and/or wireless network. In particular, the present disclosure relates to a method, apparatus, and system for identifying load and traffic imbalances among cells within a geographical sector in a telecommunication network and/or wireless network.

BACKGROUND OF THE INVENTION

In a telecommunication network, telecommunication infrastructures are designed statically, i.e., designed to meet specific traffic requirements at specific times. For example, cell site locations and allocation of radio resources at those locations depend on the type and number of users being serviced at the time of installation of the cell site (e.g., base stations, antennae, etc.). Such static design does not respond well to changes in the demand for radio resources. A naïve solution could be to expand the telecommunication infrastructure to match increasing demand or strip the telecommunication infrastructure where demands have dropped. However, expanding or stripping telecommunication infrastructure may not always be feasible because of financial and spatial constraints. Network expansion may consume a lot of human and financial resources and may be a very lengthy process that may be implemented periodically with years between implementations. For example, expanding the network infrastructure may not be possible in a densely packed city or may be undertaken after a decade because of the cost and technology involved.

Further, in some instances, there may not be sustained increased demand. Instead, the increase in demand may be random, seasonal, unbalanced, or only overload certain radio resources provided by the cell site. Such temporary or unbalanced overload may impact user access to the telecommunication network and impact the quality of service users experience. Consequently, this may result in deteriorated performance of the telecommunication and/or wireless network due to irregular and insufficient resource utilization. Additionally, underutilizing available resources may result in significant unrealized or lost revenue for the telecommunications network.

Therefore, a solution to prevent underutilization or inefficient utilization of resources in a telecommunication network by identifying load imbalance is required.

SUMMARY

According to embodiments, a method of identifying sector load imbalance, the method comprising identifying a first set of imbalanced cells in a sector based on a first condition, wherein the first condition is based on network usage of the cells in the sector; identifying a second set of imbalanced cells from the first set of imbalanced cells based on a second condition, wherein the second condition is based on one or more physical parameters associated with each of the first set of imbalanced cells; and displaying visualizations associated with the second set of imbalanced cells, the visualizations indicating miscalculations of the one or more physical parameters.

According to embodiments, the method further comprising storing information associated with the first set of imbalanced cells and the second set of imbalanced cells in distributed cloud storage.

According to embodiments, the identification of the first set of imbalanced cells comprises selecting one or more cells based on determining, for each cell in the sector, that an average number of connected users in a first frequency band in the cell is less than an average number of connected users in a second frequency band in the cell.

According to embodiments, the identification of the first set of imbalanced cells further comprises determining, for each of the selected cells, a difference in an average downlink physical resource block utilization between users in the first frequency band in a respective cell of the selected cells and the second frequency band in the respective cell of the selected cells; and selecting one or more cells based on determining that the difference in the average downlink physical resource block utilization between users in the first frequency band in the respective cell of the selected cells and the second frequency band in the respective cell of the selected cells is greater than a threshold.

According to embodiments, the identification of the second set of imbalanced cells comprises selecting one or more cells, from the first set of imbalanced cells, based on an azimuth difference between an azimuth in a first frequency band in a respective cell of the first set of imbalanced cells and an azimuth in a second frequency band in the respective cell of the first set of imbalanced cells being greater than 20 degrees.

According to embodiments, the identification of the second set of imbalanced cells comprises selecting one or more cells, from the first set of imbalanced cells, based on an antenna height difference between a second frequency band in a respective cell of the first set of imbalanced cells and a first frequency band in the respective cell of the first set of imbalanced cells being greater than 2.5 meters.

According to embodiments, the identification of the second set of imbalanced cells comprises selecting one or more cells, from the first set of imbalanced cells, based on a total tilt difference between a second frequency band in a respective cell of the first set of imbalanced cells and a first frequency band in the respective cell of the first set of imbalanced cells being less than to zero.

According to embodiments, the first frequency band is higher than the second frequency band. According to other embodiments, the first frequency band and the second frequency band are defined based on one of a base band frequency of the cells in the sector and a location of the sector.

BRIEF DESCRIPTION OF THE DRAWINGS

Features, advantages, and significance of exemplary embodiments of the disclosure will be described below with reference to the accompanying drawings, in which like signs denote like elements.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations.

As stated above, sometimes telecommunications networks experience irregular traffic that may often be unbalanced. Even though irregular traffic may be temporary, it may cause a load imbalance for the cells in the telecommunication network overloading some resources while underutilizing other resources. This inefficient use of resources may also delay user access to certain resources, deteriorating the overall performance and quality of service of the cell and consequently the network.

Thus, as a solution to inefficient utilization of resources in a telecommunication network, parameters of existing network infrastructures (e.g., base stations, cell sites, antennae, etc.) can be tuned to accommodate new traffic demands. The present disclosure details methods and parameters that may be used to tune existing network infrastructures, helping with network optimization and more efficient use of network resources. Sector imbalance identification and network infrastructure tuning is the process of finding an optimal configuration of the network infrastructure during periods of irregular network traffic and increased demand of network resources. In some embodiments, the tuning may be manual or may be remotely implemented on the network infrastructure.

Various embodiments of the present disclosure relate to identifying load imbalances within a sector of a telecommunication network using a plurality of key performance indicators (KPIs) and physical parameters associated with network infrastructure. Periodically checking intra sector conditions and loads between network infrastructures such as cell sites and antennae allows for network optimization in unexpected conditions with latest data.

Various embodiments of the present disclosure also provide details related to tuning of the physical parameters associated with cell sites. A cell site operator may use the tuning information to manually or remotely implement the changes on the cell sites. Tuning of the physical parameters associated with cell sites may result in improved network coverage, efficient distribution and use of network resources, increased revenue, improved quality of access, improved customer satisfaction, and lower churn rate.

Figure 1:
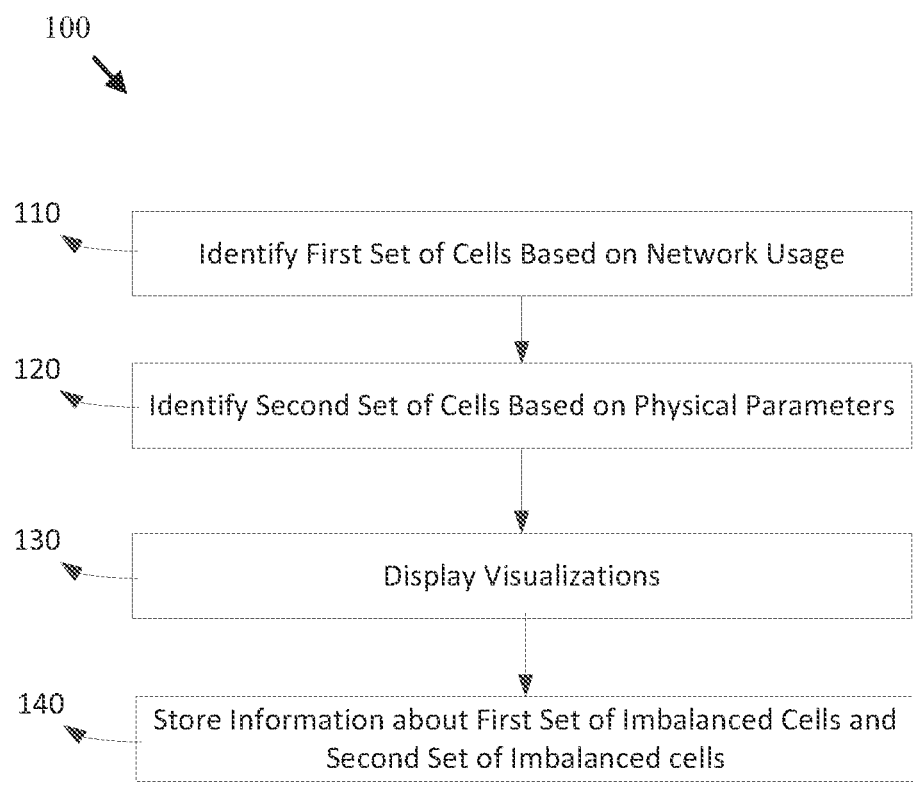
FIG. 1 is a flowchart of example processes for identification of sector load imbalance in telecommunication networks, according to embodiments.

FIG. 1 is a flowchart illustrating an example process 100 for identifying sector load imbalance in telecommunication networks. Process 100 may be implemented by systems and devices as described herein.

At 110, a first set of imbalanced cells in a sector may be identified. In some embodiments, the first set of imbalanced cells in the sector may be identified based on a first condition, wherein the first condition may be based on network usage of the cells in the sector. As an example, a distributed processing engine 304 may be used to retrieve KPI information and select the first set of imbalanced cells.

In some embodiments, the first condition may be based on KPIs associated within a specific frequency band across the network or across the cells in the sector. As an example, the first condition may be based on KPIs associated with a 2600 MHz, 1800 MHz, or 800 MHz frequency band.

In some embodiments, the first condition may be based on KPIs associated within a specific frequency band and a specific carrier across the network or across the cells in the sector. As an example, the first condition may be based on KPIs associated with a 2600 MHz, 1800 MHz, or 800 MHz frequency band associated with carrier 1 and carrier 2 as 2600C1, 1800C1, 800 C1, and 2600C2, 1800C2, 800 C2 respectively.

In some embodiments, identifying the first set of imbalanced cells in the sector may include selecting from all the cells in the sector, a subset of cells where an average number of connected users in a first frequency band in the cell may be less than an average number of connected users in a second frequency band in the cell. Identifying cells where some frequency bands have disproportionately more users connected or disproportionately few users connected may indicate an inefficient use of resources, depreciating network quality, revenue, and quality of service across the telecommunication network.

In some embodiments, identification of the first set of imbalanced cells in the sector may be based on a first condition being satisfied. The first condition may be include selecting cells where the average number of connected users in a first frequency band in the cell may be less than an average number of connected users in a second frequency band in the cell. As an example, the first condition may include selecting cells where the average number of connected users in the 2600C1 band in the cell may be less than an average number of connected users in the 1800C1 band in the cell. Table 1 includes exemplary criteria that may be used to identify a first set of imbalanced cells or may be used to determine the first condition.

TABLE 1

| Selection Based on Average Number of Connected Users | |
|---|---|
| KPI | Condition |
| Average Number of Connected Users | 2600C1 < 1800C1 |
|  | 2600C1 < 1800C2 |
|  | 2600C2 < 1800C1 |
|  | 2600C2 < 1800C2 |
|  | 1800C1 < 800C1 |
|  | 1800C1 < 800C2 |
|  | 1800C2 < 800C1 |
|  | 1800C2 < 800C2 |

In some embodiments, cells where the average number of connected users in a first frequency band in the cell may be greater than an average number of connected users in a second frequency band in the cell may not be selected because there may be no significant resource and/or load imbalance in those cells. Thus, in some embodiments, the first set of imbalanced cells may be a subset of all the cells in the sector determined based on average number of connected users.

In some embodiments, identifying the first set of imbalanced cells in the sector may include selecting from all the cells in the sector, a subset of cells where a difference in an average downlink physical resource block (DL PRB) utilization between users in the first frequency band in a respective cell and the second frequency band in the respective cell may be greater than a first threshold. Identifying cells where some frequency bands have disproportionately high utilization or disproportionately low utilization may indicate an inefficient use of resources, depreciating network quality, revenue, and quality of service across the telecommunication network.

In some embodiments, identification of the first set of imbalanced cells in the sector may be based on a first condition being satisfied. The first condition may be include selecting from all the cells in the sector, a subset of cells where the difference in the average DL PRB utilization between users in the first frequency band in a respective cell and the second frequency band in the respective cell may be greater than a first threshold. As an example, the first condition may include selecting cells where the difference in the average DL PRB utilization in the 2600C1 band in the cell and the the 1800C1 band in the cell being higher than 25%. Table 2 includes exemplary criteria that may be used to identify a first set of imbalanced cells or may be used to determine the first condition.

TABLE 2

Selection Based on Average DL PRB Utilization

| KPI | Condition | Sign | Threshold |
|---|---|---|---|
| Average DL PRB utilization | 1800C1-2600C1<br>1800C2-2600C1<br>1800C1-2600C2<br>1800C2-2600C2<br>800C1-1800C1<br>800C2-1800C1<br>800C1-1800C2<br>800C2-1800C2 | > | 25% |

In some embodiments, cells where the difference in the average DL PRB utilization between users in the first frequency band in a respective cell and the second frequency band in the respective cell may be less than or equal to 25% may not be selected because there may be no significant resource imbalance in those cells. Thus, in some embodiments, the first set of imbalanced cells may be a subset of all the cells in the sector determined based on difference in average DL PRB utilization.

According to embodiments, the first threshold may be defined by an operator or a RF engineer. The first threshold may also be pre-defined or may be defined in real time. In some embodiments, the first threshold may be included in trigger 315.

In some embodiments, identifying the first set of imbalanced cells in the sector may include filtering based on both the average number of users connected and the average DL PRB utilization. In some embodiments, identifying the first set of imbalanced cells in the sector may include cascaded filtering wherein first cells are selected based on the average number of users connected and then further filtered based on the average DL PRB utilization. In some embodiments, the cascaded filtering may be vice versa. In some embodiments, a plurality of network usage KPIs may be used in combination in any order.

At 120, a second set of imbalanced cells may be identified. According to embodiments, the second set of imbalanced cells may be identified or selected from the first set of imbalanced cells. In some embodiments, the second set of imbalanced cells in the sector may be identified based on a second condition, wherein the second condition may be based on one or more physical parameters associated with each of the cells in the sector. As an example, a distributed processing engine 304 may be used to retrieve physical parameter information associated with the cells and select the second set of imbalanced cells.

In some embodiments, physical parameters associated with the cells may be classified as a KPI. In some embodiments, the second condition may be based on KPIs associated within a specific frequency band across the network or across the cells in the sector. As an example, the second condition may be based on KPIs associated with a 2600 MHz, 1800 MHz, or 800 MHz frequency band.

In some embodiments, the second condition may be based on KPIs associated within a specific frequency band and a specific carrier across the network or across the cells in the sector. As an example, the second condition may be based on KPIs associated with a 2600 MHz, 1800 MHz, or 800 MHz frequency band associated with carrier 1 and carrier 2 as 2600C1, 1800C1, 800 C1, and 2600C2, 1800C2, 800 C2 respectively.

According to embodiments, identifying a second set of imbalanced cells from the first set of imbalanced cells may include selecting one or more cells, from the first set of imbalanced cells, based on an intra cell azimuth difference between a first frequency band in a respective cell of the first set of imbalanced cells and a second frequency band in the respective cell of the first set of imbalanced cells being greater than 20 degrees.

In some embodiments, identification of the second set of imbalanced cells may be based on a second condition being satisfied. The second condition may include selecting one or more cells, from the first set of imbalanced cells, based on an intra cell azimuth difference between a first frequency band in a respective cell of the first set of imbalanced cells and a second frequency band in the respective cell of the first set of imbalanced cells being greater than 20 degrees. As an example, the second condition may include selecting one or more cells, from the first set of imbalanced cells, based on the intra cell azimuth difference between the 2600C1 band in a respective cell of the first set of imbalanced cells and the 1800C1 band in the respective cell of the first set of imbalanced cells being greater than 20 degrees. The difference being greater than 20 degrees may include examples where the intra cell azimuth difference between the 2600C1 band and the 1800C1 band may be +20 degrees or −20 degrees. Table 3 includes exemplary criteria that may be used to identify a second set of imbalanced cells or may be used to determine the second condition based on azimuth difference.

TABLE 3

Selection Based on Azimuth Difference

| KPI | Condition | Threshold |
|---|---|---|
| Azimuth | 800C1-1800C1<br>2600C1-1800C1<br>2600C2-1800C1<br>800C1-1800C2<br>2600C1-1800C2<br>2600C2-1800C2<br>1800C2-1800C1 | >\|±20\| degree |

In some embodiments, the intra cell azimuth difference threshold may be defined by an operator or a RF engineer. The intra cell azimuth difference threshold may also be pre-defined or may be defined in real time. In some embodiments, the intra cell azimuth difference threshold may be included in trigger 315.

According to embodiments, identifying a second set of imbalanced cells from the first set of imbalanced cells may include selecting one or more cells, from the first set of imbalanced cells, based on an intra cell antenna height difference between a second frequency band in a respective cell of the first set of imbalanced cells and a first frequency band in the respective cell of the first set of imbalanced cells being greater than 2.5 meters.

In some embodiments, identification of the second set of imbalanced cells may be based on a second condition being satisfied. The second condition may include selecting one or more cells, from the first set of imbalanced cells, based on an intra cell antenna height difference between a second frequency band in a respective cell of the first set of imbalanced cells and a first frequency band in the respective cell of the first set of imbalanced cells being greater than 2.5 meters. As an example, the second condition may include selecting one or more cells, from the first set of imbalanced cells, based on an intra cell antenna height difference between the 2600C1 band and the 1800C1 band being greater than 2.5 meter. Table 4A includes exemplary criteria that may be used to identify a second set of imbalanced cells or may be used to determine the second condition based on antenna height difference.

TABLE 4A

Selection Based on Antenna Height Difference

| KPI | Condition | Threshold |
|---|---|---|
| Antenna Height | 800C1-1800C1 | >2.5 meter |
| | 800C1-1800C2 | |
| | 800C2-1800C1 | |
| | 800C2-1800C2 | |
| | 1800C1-2600C1 | |
| | 1800C2-2600C1 | |
| | 1800C1-2600C2 | |
| | 1800C2-2600C2 | |

According to embodiments, identifying a second set of imbalanced cells from the first set of imbalanced cells may include selecting one or more cells, from the first set of imbalanced cells, based on an intra cell antenna height difference between a first frequency band in a respective cell of the first set of imbalanced cells and a second frequency band in the respective cell of the first set of imbalanced cells being greater than 2.5 meters.

As an example, the second condition may include selecting one or more cells, from the first set of imbalanced cells, based on an intra cell antenna height difference between the 1800C1 band and the 2600C1 band being greater than 2.5 meters. Table 4B includes exemplary criteria that may be used to identify a second set of imbalanced cells or may be used to determine the second condition based on antenna height difference.

TABLE 4B

Selection Based on Antenna Height Difference

| KPI | Condition | Threshold |
|---|---|---|
| Antenna Height | 1800C1-800C1 | >2.5 meter |
| | 1800C1-800C2 | |
| | 1800C2-800C1 | |
| | 1800C2-800C2 | |

TABLE 4B-continued

Selection Based on Antenna Height Difference

| KPI | Condition | Threshold |
|---|---|---|
| | 2600C1-1800C1 | |
| | 2600C1-1800C2 | |
| | 2600C2-1800C1 | |
| | 2600C2-1800C2 | |

In some embodiments, the intra cell antenna height difference threshold may be defined by an operator or a RF engineer. The intra cell antenna height difference threshold may also be pre-defined or may be defined in real time. In some embodiments, the intra cell antenna height difference threshold may be included in trigger 315.

According to embodiments, identifying a second set of imbalanced cells from the first set of imbalanced cells may include selecting one or more cells, from the first set of imbalanced cells, based on an intra cell total tilt difference between a second frequency band in a respective cell of the first set of imbalanced cells and a first frequency band in the respective cell of the first set of imbalanced cells being less than zero.

In some embodiments, identification of the second set of imbalanced cells may be based on a second condition being satisfied. The second condition may include selecting one or more cells, from the first set of imbalanced cells, based on an intra cell total tilt difference between a second frequency band in a respective cell of the first set of imbalanced cells and a first frequency band in the respective cell of the first set of imbalanced cells being less than zero. As an example, the second condition may include selecting one or more cells, from the first set of imbalanced cells, based on the intra cell total tilt difference between the 2600C1 band and the 1800C1 band being less than zero. Table 5 includes exemplary criteria that may be used to identify the second set of imbalanced cells or may be used to determine the second condition based on total tilt.

TABLE 5

Selection Based on Total Tilt

| KPI | Condition | Threshold |
|---|---|---|
| Total Tilt (E-Tilt + M-Tilt) | 1800C1-2600C1 | <0 |
| | 1800C1-2600C2 | |
| | 1800C2-2600C1 | |
| | 1800C2-2600C2 | |
| | 800C1-1800C1 | |
| | 800C1-1800C2 | |
| | 800C2-1800C1 | |
| | 800C2-1800C2 | |

Total tilt for a cell may include a combination of electronic tilt and mechanical tilt. In some embodiments, the intra cell total tilt difference threshold may be defined by an operator or a RF engineer. The intra cell total tilt difference threshold may also be pre-defined or may be defined in real time. In some embodiments, the intra cell total tilt difference threshold may be included in trigger 315.

Identifying and tuning one or more physical parameters associated with the cells that may be misaligned or miscalculated or may need to be realigned or recalculated may enable efficient use of resources, improve network quality, revenue, and quality of service across the telecommunication network.

In some embodiments, identifying the second set of imbalanced cells in the sector may include filtering based on a plurality of physical parameters associated with the cells. In some embodiments, a plurality of physical parameters associated with the cells may be used in any combination in any order. In some embodiments, identifying the second set of imbalanced cells from the first set of imbalanced cells in the sector may include independent and parallel selection of cells based on each of azimuth difference, antenna height difference, or total tile difference. After the parallel selection, a subset of cells that may be common to two of the selections may be identified. In some embodiments, after the parallel selection, a subset of cells that may be common to all of the selections may be identified.

In some embodiments, identifying the second set of imbalanced cells from the first set of imbalanced cells in the sector may include filtering based on each of the plurality of physical parameters associated with the cells. Further, according to some embodiments, identifying the second set of imbalanced cells from the first set of imbalanced cells may include cascaded filtering wherein the cells from the first set of imbalanced cells are filtered based on azimuth difference, then antenna height difference, and finally total tile difference. This cascaded filtering may be in any order and may include a plurality of physical parameters associated with the cells.

In some embodiments, the frequency bands may be specific to the country in which a sector may be located. In some embodiments, the frequency bands may be defined by the operator of the cell or a RF engineer based on the location of the cell, the population and usage characteristics of the users in the area surrounding the cell, a base band of the cell often determined at the time of installing the cell, etc.

According to embodiments, the first frequency band may be of a higher frequency than the second frequency band. The opposite may be true as well. In instances where the frequency bands may be defined by the operator of the cell or a RF engineer, the first frequency band and the second frequency band may be defined based on the base band frequency of the cells in the sector and/or the location of the sector.

At 130, visualizations associated with the second set of imbalanced cells may be displayed. As an example, visualizations associated with the second set of imbalanced cells may be displayed on a device 420 associated with the operator or RF engineer. The device 420 may communicate with a cloud platform 310 to receive and display visualization information. In some embodiments, a report may be generated and displayed, the report including information about one or more physical parameters associated with the cells in the sector being miscalculated. As an example, a report and visualization 330 may be computed and/or generated. The intra cell azimuth difference, intra cell antenna height difference, or the intra cell total tile difference may be included in the displayed visualizations, wherein the intra cell azimuth difference, intra cell antenna height difference, or the intra cell total tile difference may indicate the extent of miscalculation or tuning to be performed on the cells to rebalance the unbalanced cells in a sector. As an example, cells where the intra cell azimuth difference may be greater than 20 degrees, the cells may be marked and/or displayed with an indicator of "Azimuth Misaligned." Similarly, cells where the intra cell antenna height difference may be greater than 2.5 meters, the cells may be marked and/or displayed with an indicator of "Antenna Misplaced." In embodiments, the cells where the intra cell total tilt difference may be less than zero, the cells may be marked and/or displayed with an indicator of "Azimuth misaligned."

In some embodiments, the report may also include information about the corrections or tuning needed by one or more physical parameters associated with the cells to rebalance the cell.

At 140, information about the first set of imbalanced cells and the second set of imbalanced cells may be stored in a database. In addition to information about the imbalanced cells, information about any miscalculated or misaligned physical parameters associated with the imbalanced cells, information related to visualization of imbalanced cells, and/or updated on-air site data may also be stored in a database. The database may be structured or unstructured. As an example, information about the first set of imbalanced cells and the second set of imbalanced cells may be stored in the unstructured database 306 or structured database 308.

According to some embodiments, the process 100 may be initiated by an operator or a RF engineer using a user interface or an application programming interface on a device 420. The process 100 may be executed on a distributed processing engine 304. Further, according to embodiments, the process 100 may be initiated weekly, daily, or in real-time.

According to some embodiments, the above described identification and selection may be cascaded, i.e., the output of one selection may be made the input of another. As an example, the identification of the first set of imbalanced cells may include multiple cascaded steps—a first filter based on average number of connected users and then a second filter based on difference in average DL PRB utilization applied to the cells selected in the first filter. As another example, the identification of the second set of imbalanced cells from the first set may include multiple cascaded steps—a first filter based on azimuth difference, then second filter based on antenna height difference, followed by total tilt difference, or any combination thereof.

Figure 2:
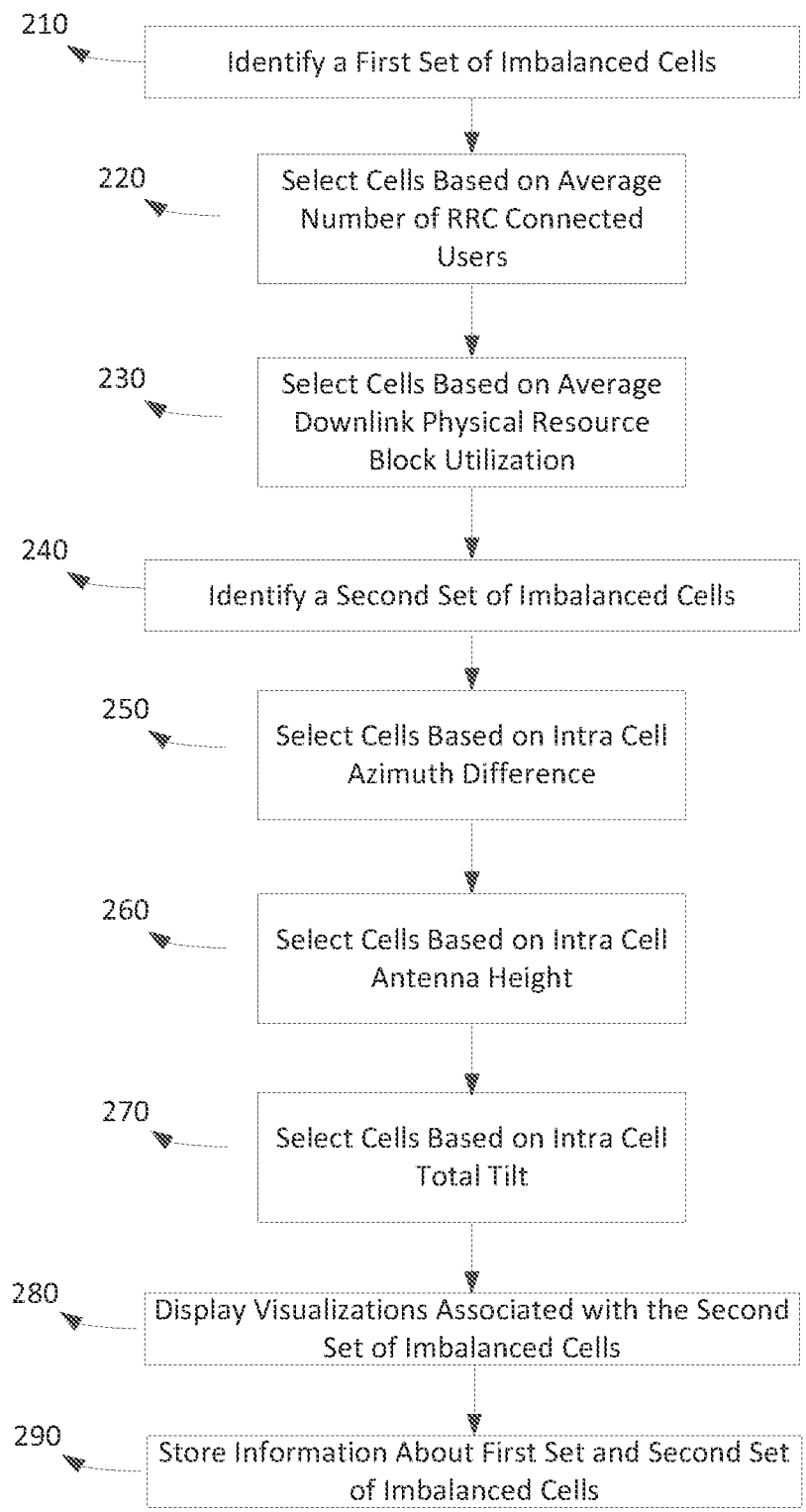
FIG. 2 is a flowchart of example processes for identification of sector load imbalance in telecommunication networks, according to embodiments.

FIG. 2 is a flowchart illustrating an example process 200 for identifying sector load imbalance in telecommunication networks. Process 200 may be implemented by systems and devices as described herein.

At 210, a first set of imbalanced cells in a sector may be identified. In some embodiments, the first set of imbalanced cells in the sector may be identified based on a first condition, wherein the first condition may be based on network usage of the cells in the sector. As an example, a distributed processing engine 304 may be used to retrieve KPI information and select the first set of imbalanced cells.

At 220, cells may be selected based on an average number of connected users. In some embodiments, cells may be selected from all the cells present in the sector based on the average number of connected users in a first frequency band in the cell may be less than an average number of connected users in a second frequency band in the cell.

At 230, cells may be selected based on an average DL PRB utilization. In some embodiments, cells may be selected from the previously selected cells. According to some embodiments, for each of the selected cells, a difference in an average DL PRB utilization between users in the first frequency band in a respective cell of the selected cells and the second frequency band in the respective cell of the selected cells may be determined. Based on the determined difference in the average DL PRB utilization between users in the first frequency band in the respective cell of the selected cells and the second frequency band in the respective cell of the selected cells being greater than a threshold, one or more cells may be selected from the previously selected cells. Thus, at 230, the first set of imbalanced cells may be selected based on the average number of connected users and the average DL PRB utilization.

At 240, a second set of imbalanced cells may be identified. According to embodiments, the second set of imbalanced cells may be identified or selected from the first set of imbalanced cells. In some embodiments, the second set of imbalanced cells in the sector may be identified based on a second condition, wherein the second condition may be based on one or more physical parameters associated with each of the cells in the sector. As an example, a distributed processing engine 304 may be used to retrieve physical parameter information associated with the cells and select the second set of imbalanced cells.

At 250, cells may be selected from the first set of imbalanced cells based on intra cell azimuth difference. As an example, cells may be selected based on intra cell azimuth difference between a first frequency band in a respective cell of the first set of imbalanced cells and a second frequency band in the respective cell of the first set of imbalanced cells being greater than 20 degrees.

At 260, cells may be selected from the cells selected at step 250 based on intra cell antenna height difference. As an example, cells may be selected based on an intra cell antenna height difference between the second frequency band and the first frequency band in a respective cell, from the cells selected based on intra cell azimuth difference, being greater than 2.5 meters. Thus, the cells selected at step 260 may be a subset of the cells selected at step 250.

At 270, cells may be selected from the cells selected at step 260 based on intra cell total tilt difference. As an example, cells may be selected based on an intra cell total tilt difference between the second frequency band and the first frequency band in a respective cell, from the cells selected based on intra cell antenna height difference, being less than zero. Thus, the cells selected at step 270 may be a subset of the cells selected at step 260.

Thus, at 270, the second set of imbalanced cells may be selected based on the intra cell azimuth difference, the intra cell antenna height difference, and intra cell total tilt difference.

At 280, visualizations associated with the second set of imbalanced cells may be displayed. According to embodiments, visualizations associated with the second set of imbalanced cells may be displayed on a device 420 associated with the operator or RF engineer. The device 420 may communicate with a cloud platform 310 to receive and display visualization information. In some embodiments, a report may be generated and displayed, the report including information about one or more physical parameters associated with the cells in the sector being miscalculated. In some embodiments, the report may also include information about the corrections or tuning needed by one or more physical parameters associated with the cells to rebalance the cell.

At 290, information about the first set of imbalanced cells and the second set of imbalanced cells may be stored in a database. In addition to information about the imbalanced cells, information about any miscalculated or misaligned physical parameters associated with the imbalanced cells, information related to visualization of imbalanced cells, and/or updated on-air site data may also be stored in a database. The database may be structured or unstructured. As an example, information about the first set of imbalanced cells and the second set of imbalanced cells may be stored in the unstructured database 306 or structured database 308.

According to some embodiments, the process 200 may be initiated by an operator or a RF engineer using a user interface or an application programming interface on a device 420. The process 200 may be executed on a distributed processing engine 304. Further, according to embodiments, the process 200 may be initiated weekly, daily, or in real-time.

Figure 3:
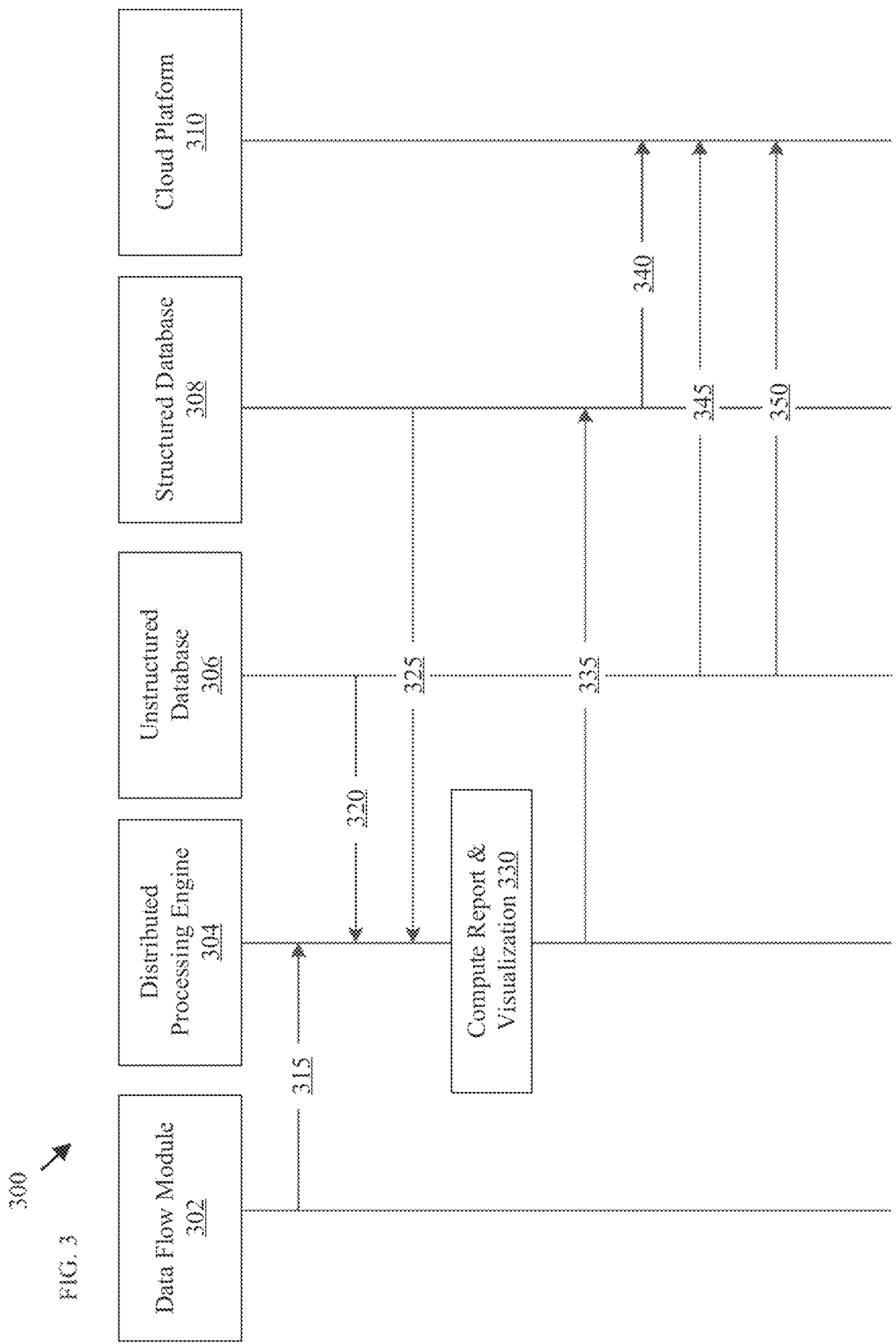
FIG. 3 is an example diagrammatic illustration of a data flow process for identification of sector load imbalance in telecommunication networks, according to embodiments.

FIG. 3 is a diagrammatic illustration of an example process as described herein. As shown in FIG. 3, a data flow process 300 may be used for identification and display of sector load imbalance in telecommunication networks.

Referring to FIG. 3, a trigger 315 may be generated through a data flow module 302 that enables data transfer between systems to identify sector load imbalance in a telecommunication network. A data flow module 302 may act as a module that automates and manages data flow between multiple systems. In some embodiments, the data flow module 302 may be graph based to enable data routing between disparate systems. As an example, a data flow module 302 may be implemented using Apache NiFi™ or similar data flow software. In some embodiments, the data flow module 302 may generate the trigger 315 automatically at pre-defined time intervals. In some embodiments, an operator or radio frequency (RF) engineer may manually request the generation of the trigger 315 using an application programming interface. In some embodiments, artificial intelligence and machine learning methods may be used to determine optimal times to generate the trigger 315 to identify sector load imbalance in a telecommunication network. In some embodiments, the trigger 315 may include information about the geographical limits of the sector in which the load imbalance may be identified.

Once generated, the trigger 315 may trigger a distributed processing engine 304 (e.g., Spark™) to read KPIs 320 associated with the cell sites in the sector from one or more databases. KPIs associated with cell sites may include cell site specific or sector specific KPIs across multiple frequency bands such as average users connected, average downlink or uplink physical resource block utilization, uptime, network jitter, packet loss, latency, signal strength, average user session time, throughput, partial cell availability, handover preparation & execution, etc. In some embodiments, these KPIs may be computed across a sectors, a cell, or a frequency band to estimate network performance. In some embodiments, the trigger 315 may trigger the distributed processing engine 304 to read KPIs 320 from an unstructured database 306 (e.g., HBase™). In some embodiments, in addition to triggering the distributed processing engine 304 to read KPIs 320, the trigger 315 may also trigger the distributed processing engine 304 to read on-air site data 325 from a structured database 308 (e.g., MySQL™). Structured database 308 and unstructured database 308 may be implemented as a cloud-based server. Examples of cloud based database servers may include, but are not limited to, Hadoop®, MongoDB®, MySQL®, NoSQL®, and Oracle®.

The unstructured database 306 may be used to store KPIs across cells, sectors, and the telecommunication network because of the large quantity of data and the need for quick access to the data. The structured database 308 may be used to store on-air site data relating to latitude, longitude, azimuth, band details, ECGI antenna height, electrical tilt, mechanical tilt, etc. for the cells in the telecommunication network. Since the on-air site data may oftentimes include but may not be limited to physical parameters associated with the cells, it may not be as large as KPI related information and can be stored and extracted quickly using the structured database 308.

The distributed processing engine 304 may compute a report and visualization 330 identifying imbalanced cells based on the read KPIs 320, the read on-air site data 325, and the trigger 315. In some embodiments, the report and visualization 330 may include information associated with the second set of imbalanced cells. Additionally, report and visualization 330 may also include information about one or more physical parameters associated with the cells in the sector being miscalculated, azimuth difference, antenna height difference, or total tile difference. In some embodiments, the azimuth difference, antenna height difference, or the total tile difference may indicate the extent of miscalculation or tuning to be performed on the cells to rebalance the unbalanced cells in a sector. In some embodiments, the report and visualization 330 may also include information about the corrections or tuning needed by one or more physical parameters associated with the cells to rebalance the cell.

Based on the computed report and visualization 330, the distributed processing engine 304 may store information about the imbalanced cells 335, information about any miscalculated or misaligned physical parameters associated with the imbalanced cells, information related to visualization of imbalanced cells, and/or updated on-air site data on the structured database 308. In some embodiments, the distributed processing engine 304 may store above-mentioned information in the unstructured database 306.

An authorized user, an operator of a cell, or a RF engineer may use a cloud platform 310 initiate the identification and/or visualization of imbalanced load in a sector. The cloud platform 310 may be a Platform as a Service (PaaS) model providing hosting services, REST APIs, and back-end services for mobile applications. Using a user interface and/or a user device, cloud platform 310 may retrieve the computed report and visualization 330 from the unstructured database 306 or structured database 304. In some embodiments, cloud platform 310 may retrieve updated site data 340, retrieve information about the imbalanced cells 350, or retrieve information related to visualization of imbalanced cells 345 may be retrieved from the unstructured database 306 or structured database 304 using the user interface and/or the user device.

Figure 4:
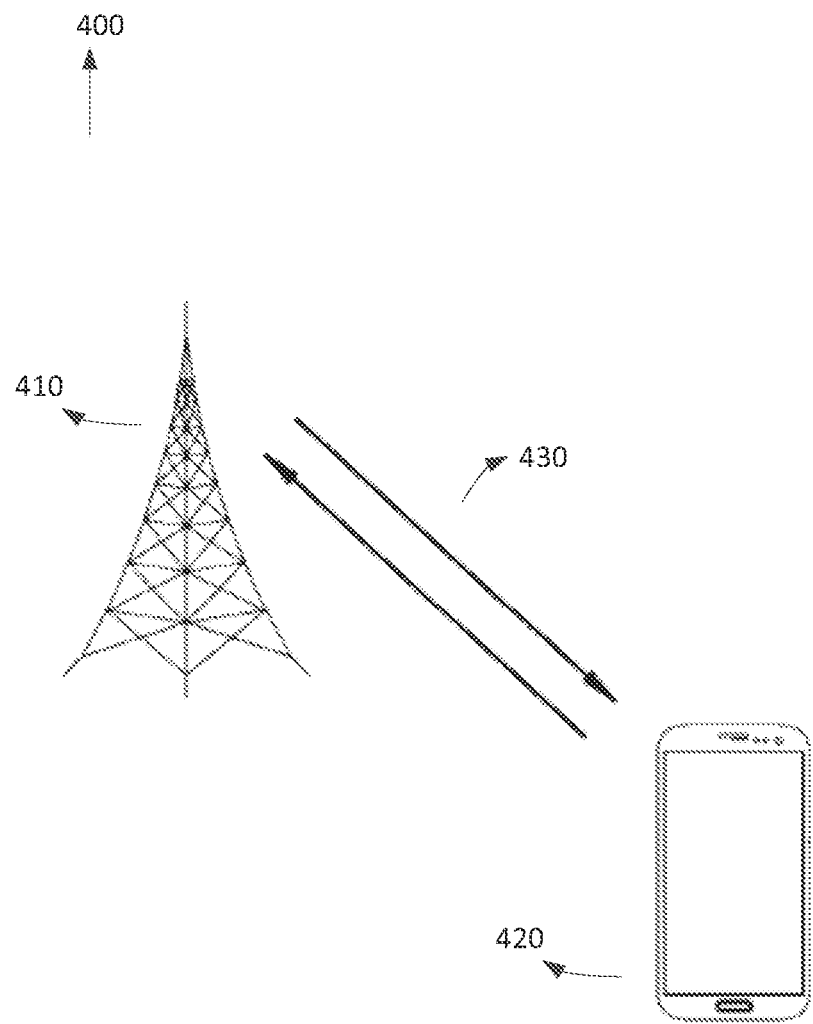
FIG. 4 is a diagram of an example environment in which systems and/or methods, described herein, may be implemented, according to embodiments.

FIG. 4 illustrates a snippet of a telecommunication network system according to example embodiments of the disclosure.

Referring to FIG. 4, according to example embodiments, a cell 410 and an electronic device 420 may be provided in a wireless communication system 430. The cell 410 and the electronic device 420 may be illustrated as nodes using a radio channel in the wireless communication system 430. The cell 410 may be a network infrastructure which provides a wireless connection to the electronic device 420. The cell 410 may have a coverage defined as a certain geographical region also known as a sector based on a signal transmittable distance.

The electronic device 420 may be a device used by an operator, an authorized user, or a RF engineer and may communicate with the cell 410 through a radio channel. The electronic device 420 may be replaced by a 'terminal', 'user equipment (UE)', a 'mobile station', a 'subscriber station', customer premises equipment (CPE)', a 'remote terminal', a 'wireless terminal', a 'user device', 'device,''laptop,''computing device,' or other terms having the technical meaning equivalent thereto.

Figure 5:
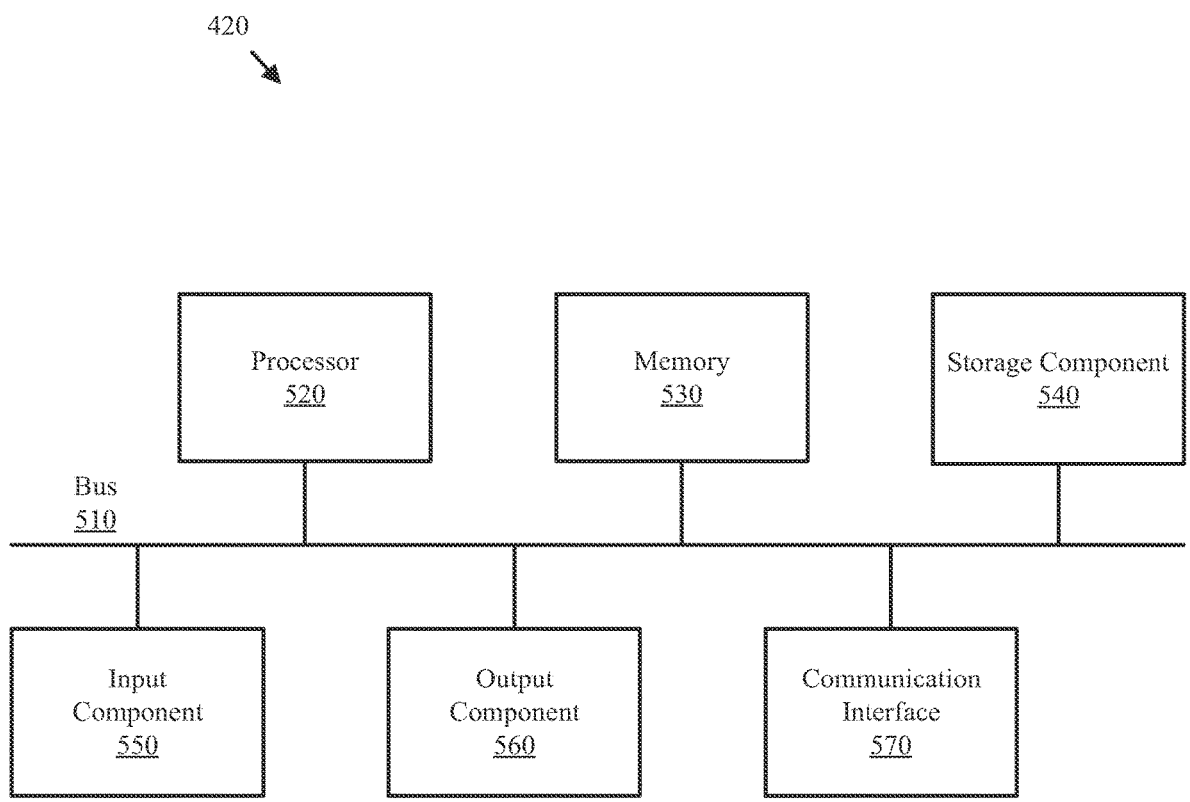
FIG. 5 is a diagram of example components of one or more devices of FIG. 4, according to embodiments.
Figure 6A:
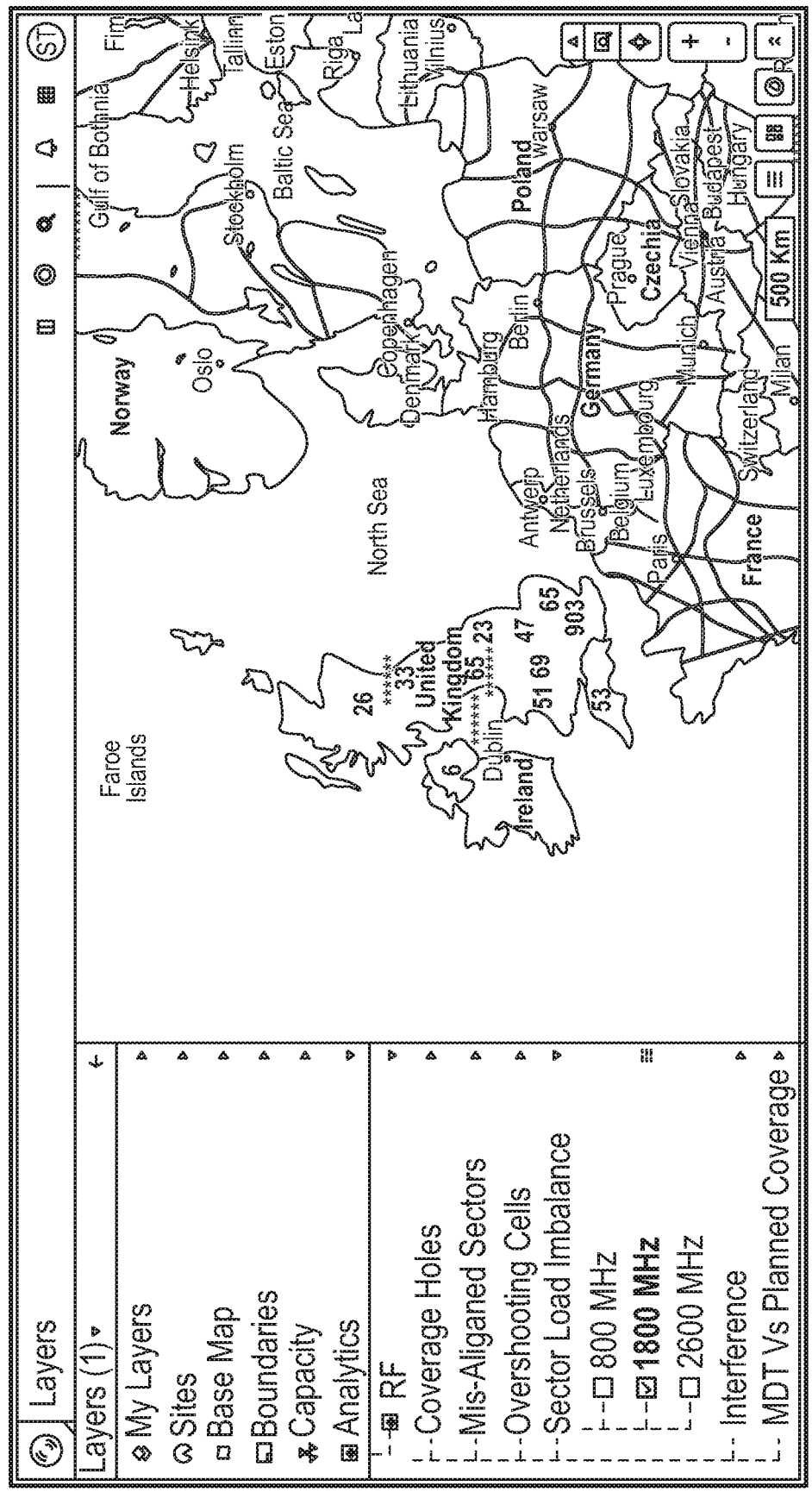
FIGS. 6A-6D are example illustrations of a user interface for identification of sector load imbalance in telecommunication networks, according to embodiments.
Figure 6B:
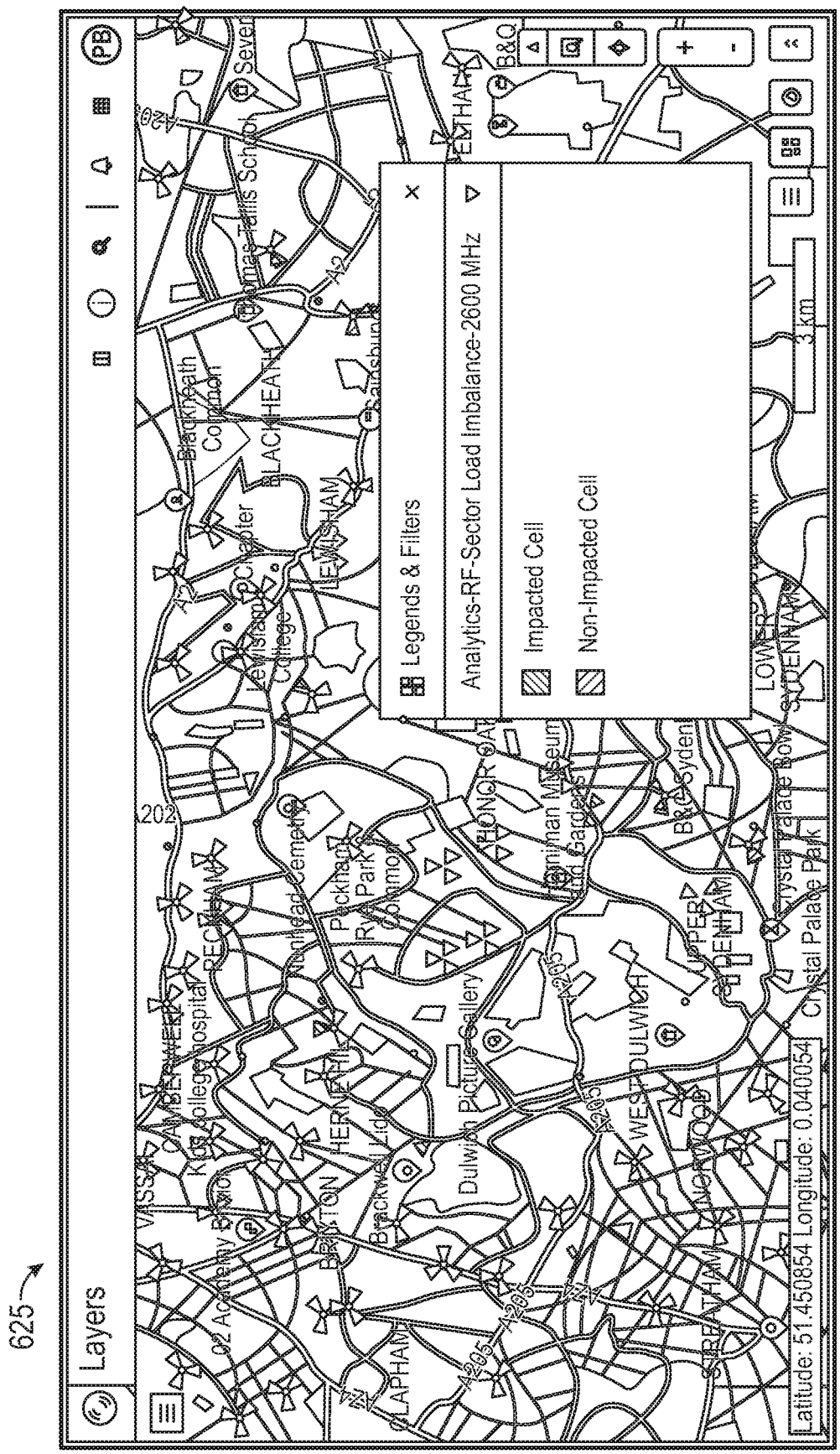
Figure 6C:
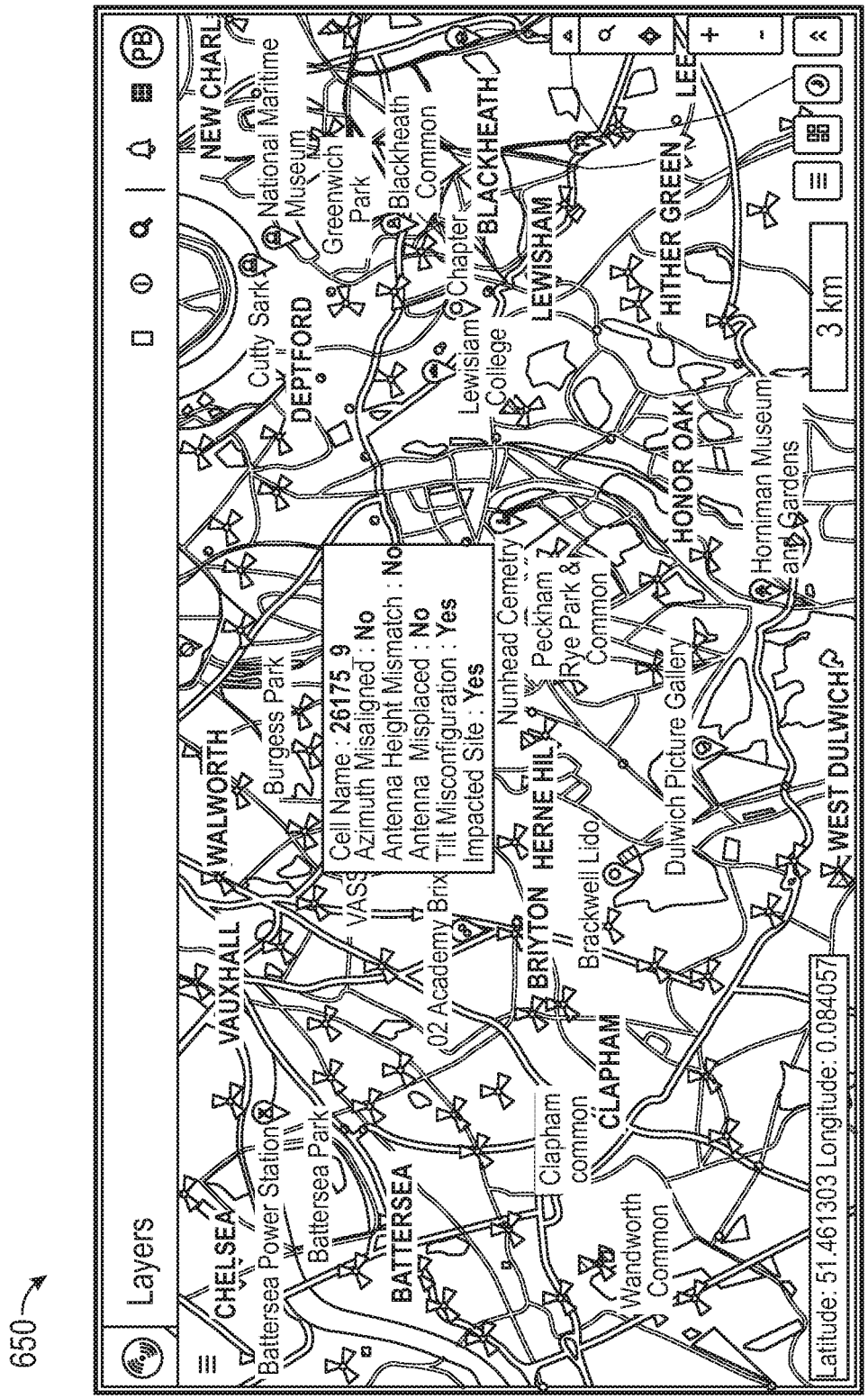
Figure 6D:
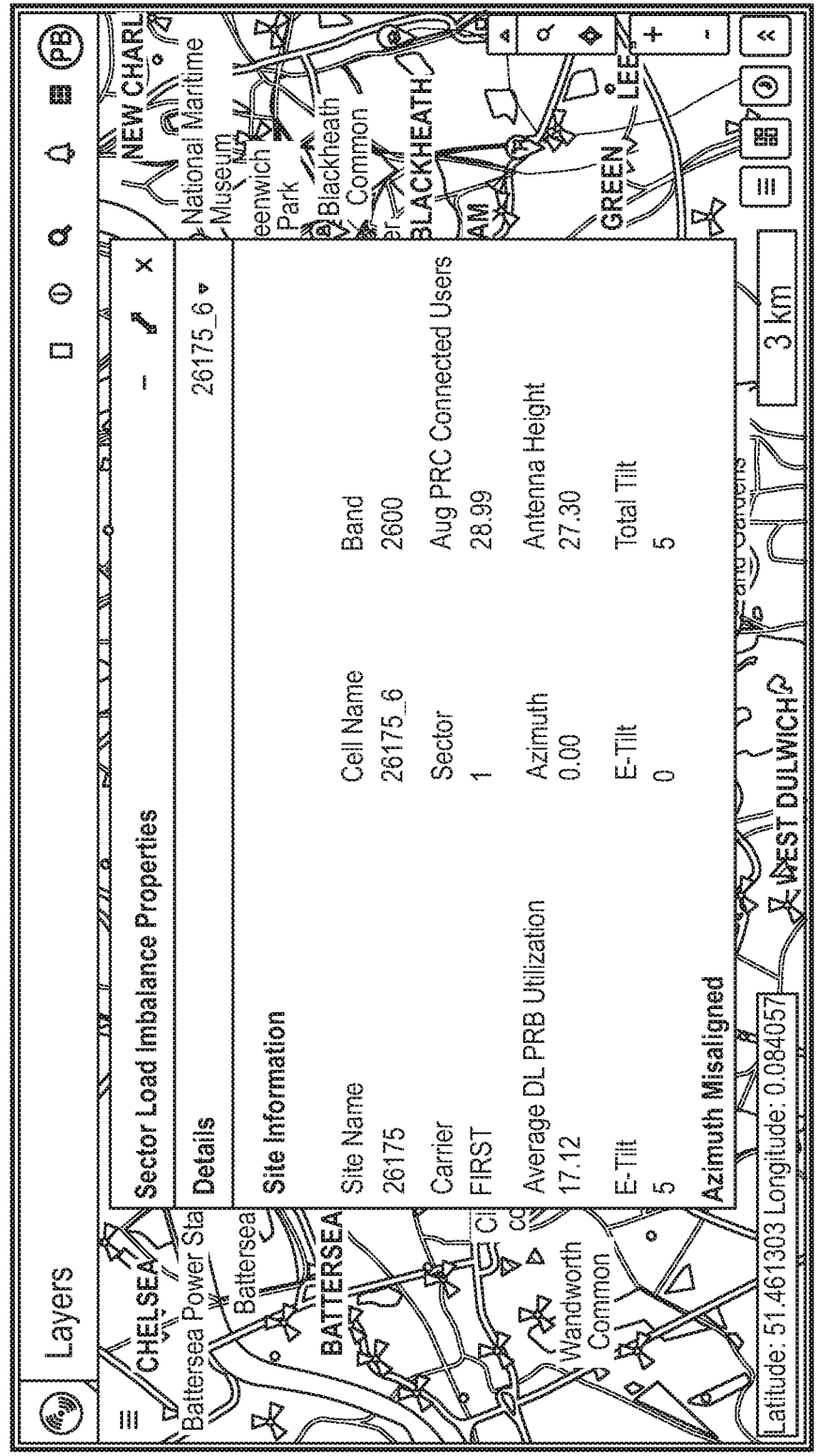

FIG. 5 is a diagram of example components of a device 420. Device 420 may correspond to a device associated with an authorized user, an operator of a cell, or a RF engineer. Device 420 may be used to communicate with cloud platform 310. As shown in FIG. 5, device 420 may include a bus 510, a processor 520, a memory 530, a storage component 540, an input component 550, an output component 560, and a communication interface 570.

Bus 510 includes a component that permits communication among the components of device 420. Processor 520 may be implemented in hardware, firmware, or a combination of hardware and software. Processor 520 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 420. For example, storage component 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 550 includes a component that permits device 420 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 420 (e.g., a display, a speaker, and/or one or more light-emitting diodes (LEDs)).

Communication interface 570 includes a transceiver-like component (e.g., a transceiver and/or a separate receiver and transmitter) that enables device 420 to communicate with other devices, such as via a wired connection, a wireless connection, or a combination of wired and wireless connections. Communication interface 570 may permit device 420 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, or the like.

Device 420 may perform one or more processes described herein. Device 420 may perform these processes in response to processor 520 executing software instructions stored by a non-transitory computer-readable medium, such as memory 530 and/or storage component 540. A computer-readable medium may be defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein.

FIGS. 6A-D illustrate diagrams of user interfaces 600, 625, 650, and 675 displaying visualizations associated with the imbalanced cells. As seen in user interface 675, KPIs and physical parameters associated with the cell such as average number of users connected, average DL PRB utilization, intra cell azimuth difference, intra cell antenna height difference, or the intra cell total tile difference may be included in the displayed visualizations, wherein the intra cell azimuth difference, intra cell antenna height difference, or the intra cell total tile difference may indicate the extent of miscalculation or tuning to be performed on the cells to rebalance the unbalanced cells in a sector 1.

The number and arrangement of components shown in FIG. 5 are provided as an example. In practice, device 420 may include additional components, fewer components, different components, or differently arranged components than those shown in FIG. 5. Additionally, or alternatively, a set of components (e.g., one or more components) of device 420 may perform one or more functions described as being performed by another set of components of device 420.

Although FIGS. 1-2 shows example blocks of process 100 and 200. In some implementations, processes 100 and 200 may include additional blocks, fewer blocks, different blocks, or differently arranged blocks than those depicted in FIGS. 1-2. In embodiments, one or more blocks of example blocks of process 100 and 200 may be combined or arranged in any order or amount. In embodiments, two or more of the blocks of processes 100 and 200 may be performed in parallel.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

As is traditional in the field, telecommunication networks and wireless networks are used interchangeably and refer to infrastructure that enables communication using radio resources.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise.

What is claimed is:

1. A method for identifying sector load imbalance, the method comprising:

identifying a first set of imbalanced cells in a sector based on a first condition, wherein the first condition is based on network usage of the cells in the sector;

identifying a second set of imbalanced cells from the first set of imbalanced cells based on cascade filtering involving azimuth, antenna height, and total tilt associated with each of the first set of imbalanced cells; and displaying visualizations associated with the second set of imbalanced cells, the visualizations indicating miscalculations of the azimuth, antenna height, and total tilt.

2. The method of claim 1, wherein the identification of the first set of imbalanced cells comprises selecting one or more cells based on determining, for each cell in the sector, that an average number of connected users in a first frequency band in the cell is less than an average number of connected users in a second frequency band in the cell.

3. The method of claim 2, wherein the identification of the first set of imbalanced cells further comprises:

determining, for each of the selected cells, a difference in an average downlink physical resource block utilization between users in the first frequency band in a respective cell of the selected cells and the second frequency band in the respective cell of the selected cells; and selecting one or more cells based on determining that the difference in the average downlink physical resource block utilization between users in the first frequency band in the respective cell of the selected cells and the second frequency band in the respective cell of the selected cells is greater than a threshold.

4. The method of claim 1, wherein the identification of the second set of imbalanced cells comprises selecting one or more cells, from the first set of imbalanced cells, based on an azimuth difference between an azimuth in a first frequency band in a respective cell of the first set of imbalanced cells and an azimuth in a second frequency band in the respective cell of the first set of imbalanced cells being greater than 20 degrees.

5. The method of claim 1, wherein the identification of the second set of imbalanced cells comprises selecting one or more cells, from the first set of imbalanced cells, based on an antenna height difference between a second frequency band in a respective cell of the first set of imbalanced cells and a first frequency band in the respective cell of the first set of imbalanced cells being greater than 2.5 meters.

6. The method of claim 1, wherein the identification of the second set of imbalanced cells comprises selecting one or more cells, from the first set of imbalanced cells, based on a total tilt difference between a second frequency band in a respective cell of the first set of imbalanced cells and a first frequency band in the respective cell of the first set of imbalanced cells being less than zero.

7. The method of claim 2, wherein the first frequency band is higher than the second frequency band.

8. The method of claim 2, wherein the first frequency band and the second frequency band are defined based on one of a base band frequency of the cells in the sector and a location of the sector.

9. The method of claim 1, further comprising storing information associated with the first set of imbalanced cells and the second set of imbalanced cells in distributed cloud storage.

10. A device for identifying sector load imbalance, the device comprising:

a memory configured to store instructions; and at least one processor configured to execute the instructions to:

identify a first set of imbalanced cells in a sector based on a first condition, wherein the first condition is based on network usage of the cells in the sector;

identify a second set of imbalanced cells from the first set of imbalanced cells based on cascade filtering involving azimuth, antenna height, and total tilt, associated with each of the first set of imbalanced cells; and display visualizations associated with the second set of imbalanced cells, the visualizations indicating miscalculations of the azimuth, antenna height, and total tilt.

11. The device of claim 10, wherein the identification of the first set of imbalanced cells comprises selecting one or more cells based on determining, for each cell in the sector, that an average number of connected users in a first frequency band in the cell is less than an average number of connected users in a second frequency band in the cell.

12. The device of claim 11, wherein the identification of the first set of imbalanced cells further comprises:

determining, for each of the selected cells, a difference in an average downlink physical resource block utilization between users in the first frequency band in a respective cell of the selected cells and the second frequency band in the respective cell of the selected cells; and selecting one or more cells based on determining that the difference in the average downlink physical resource block utilization between users in the first frequency band in the respective cell of the selected cells and the second frequency band in the respective cell of the selected cells is greater than a threshold.

13. The device of claim 10, wherein the identification of the second set of imbalanced cells comprises selecting one or more cells, from the first set of imbalanced cells, based on an azimuth difference between an azimuth in a first frequency band in a respective cell of the first set of imbalanced cells and an azimuth in a second frequency band in the respective cell of the first set of imbalanced cells being greater than 20 degrees.

14. The device of claim 10, wherein the identification of the second set of imbalanced cells comprises selecting one or more cells, from the first set of imbalanced cells, based on an antenna height difference between a second frequency band in a respective cell of the first set of imbalanced cells and a first frequency band in the respective cell of the first set of imbalanced cells being greater than 2.5 meters.

15. The device of claim 10, wherein the identification of the second set of imbalanced cells comprises selecting one or more cells, from the first set of imbalanced cells, based on a total tilt difference between a second frequency band in a respective cell of the first set of imbalanced cells and a first frequency band in the respective cell of the first set of imbalanced cells being less than zero.

16. The device of claim 10, wherein the at least one processor is further configured to execute the instructions to store information associated with the first set of imbalanced cells and the second set of imbalanced cells in distributed cloud storage.

17. A non-transitory computer-readable medium storing instructions, the instructions comprising: one or more instructions that, when executed by at least one processor of a device for automatic troubleshooting, cause the at least one processor to:

identify a first set of imbalanced cells in a sector based on a first condition, wherein the first condition is based on network usage of the cells in the sector;

identify a second set of imbalanced cells from the first set of imbalanced cells based on cascade filtering involving azimuth, antenna height, and total tilt associated with each of the first set of imbalanced cells; and display visualizations associated with the second set of imbalanced cells, the visualizations indicating miscalculations of the azimuth, antenna height, and total tilt.

18. The non-transitory computer-readable medium of claim 17, wherein the identification of the first set of imbalanced cells comprises selecting one or more cells based on determining, for each cell in the sector, that an average number of connected users in a first frequency band in the cell is less than an average number of connected users in a second frequency band in the cell.

19. The non-transitory computer-readable medium of claim 18, wherein the identification of the first set of imbalanced cells further comprises:

determining, for each of the selected cells, a difference in an average downlink physical resource block utilization between users in the first frequency band in a respective cell of the selected cells and the second frequency band in the respective cell of the selected cells; and selecting one or more cells based on determining that the difference in the average downlink physical resource block utilization between users in the first frequency band in the respective cell of the selected cells and the second frequency band in the respective cell of the selected cells is greater than a threshold.

20. The non-transitory computer-readable medium of claim 17, comprising instructions that further cause the one or more processors to store information associated with the first set of imbalanced cells and the second set of imbalanced cells in distributed cloud storage.

* * * * *